United States Patent [19]

Tanaka et al.

[11] Patent Number: 4,794,819
[45] Date of Patent: Jan. 3, 1989

[54] CONTROL SYSTEM FOR A CONTINUOUSLY VARIABLE TRANSMISSION

[75] Inventors: Hiroshi Tanaka, Tokyo; Yoshihiko Morimoto, Mitaka, both of Japan

[73] Assignee: Fuji Jukogyo Kabushiki Kaisha, Tokyo, Japan

[21] Appl. No.: 29,854

[22] Filed: Mar. 24, 1987

[30] Foreign Application Priority Data

Mar. 28, 1986 [JP] Japan ................................ 61-70225

[51] Int. Cl.$^4$ .............................................. B60K 41/12
[52] U.S. Cl. ........................................ 74/866; 74/868
[58] Field of Search .................. 74/866, 867, 868, 864, 74/865, 877; 474/11, 12, 18, 28; 364/424.1

[56] References Cited

U.S. PATENT DOCUMENTS

| | | | |
|---|---|---|---|
| 4,458,560 | 7/1984 | Frank et al. | 74/866 X |
| 4,462,275 | 7/1984 | Mohl et al. | 74/866 |
| 4,476,746 | 10/1984 | Miki et al. | 74/866 X |
| 4,509,125 | 4/1985 | Fattic et al. | 74/866 X |
| 4,594,916 | 6/1986 | Ito et al. | 74/866 |
| 4,637,280 | 1/1987 | Oshiage | 74/866 |
| 4,653,006 | 3/1987 | Osanai et al. | 74/866 X |
| 4,658,360 | 4/1987 | Osanai et al. | 74/866 X |
| 4,672,864 | 6/1987 | Morimoto | 74/866 |
| 4,680,990 | 7/1987 | Ohgami | 74/866 X |

FOREIGN PATENT DOCUMENTS 217048 5/1983 Japan .

Primary Examiner—Leslie A. Braun
Assistant Examiner—David Novais
Attorney, Agent, or Firm—Martin A. Farber

[57] ABSTRACT

A control system for a continuously variable transmission has a transmission ratio control valve having a spool for controlling oil supplied to a cylinder of a drive pulley to change the transmission ratio. The tansmission ratio control valve has chambers at both ends of the spool. By controlling flow rate of oil supplied to the chambers with a control signal in accordance with a desired transmission ratio, the spool is shifted, so that the transmission ratio is controlled to a desired transmission ratio. When the actual transmission ratio does not coincide with the desired ratio in a steady state of an engine, the control signal is corrected so as to reduce the difference between the desired transmission ratio and the actual ratio.

13 Claims, 9 Drawing Sheets

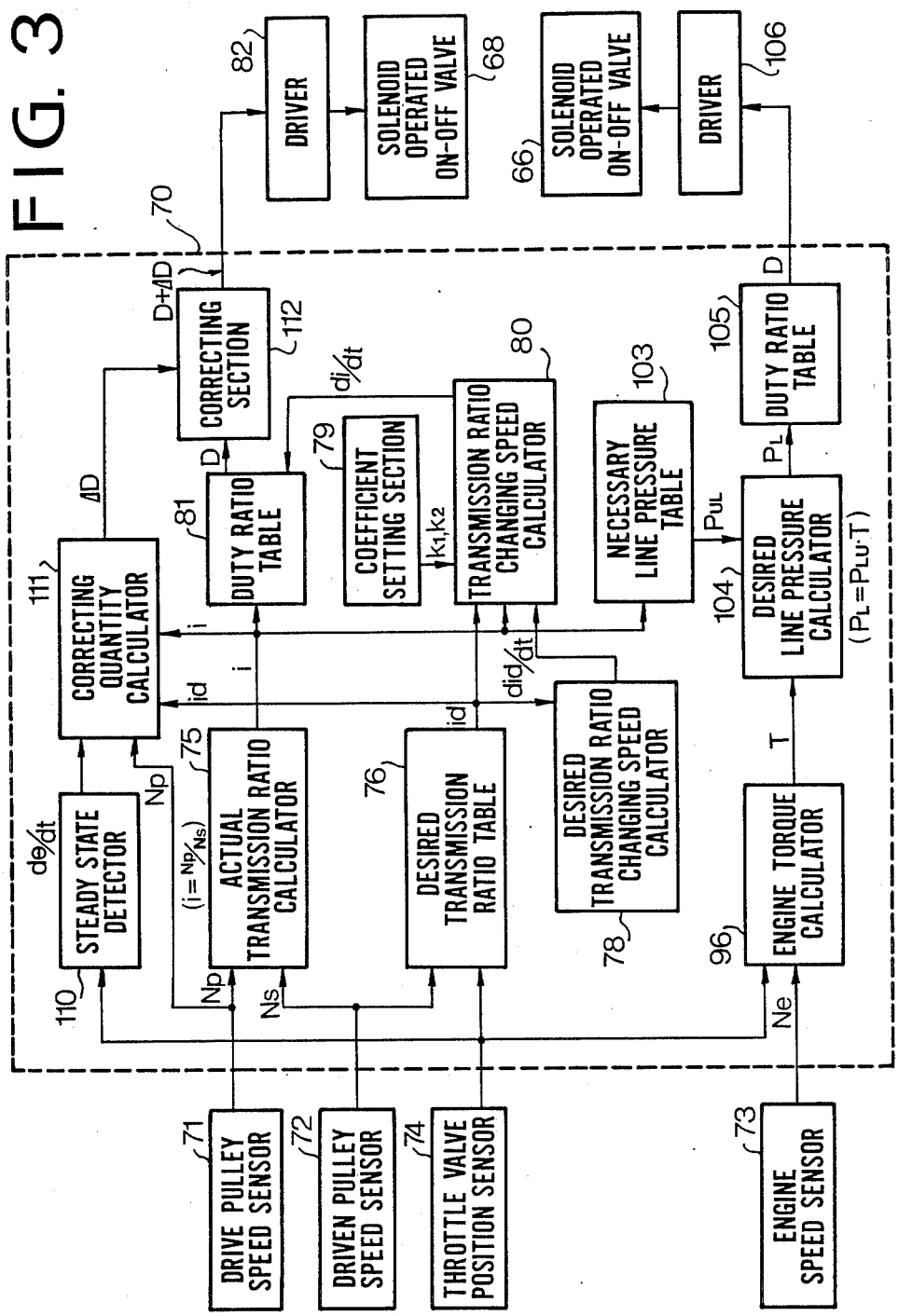

CONTROL SYSTEM FOR A CONTINUOUSLY VARIABLE TRANSMISSION

BACKGROUND OF THE INVENTION

The present invention relates to a control system for a continuously variable belt-drive automatic transmission for a motor vehicle, and more particularly to a system for controlling the transmission ratio at a minimum transmission ratio.

A known control system for a continuously variable belt-drive transmission comprises an endless belt running over a drive pulley and a driven pulley. Each pulley comprises a movable conical disc which is axially moved by a fluid operated servo device so as to vary the running diameter of the belt on the pulleys in dependence on driving conditions. The system is provided with a hydraulic circuit including a pump for supplying oil to the servo devices, a line pressure control valve and a transmission ratio control valve. Each valve comprises a spool to control the oil supplied to the servo devices.

The transmission ratio control valve operates to decide the transmission ratio in accordance with the opening degree of a throttle valve of an engine and the speed of the engine. The line pressure control valve is adapted to control the line pressure in accordance with the transmission ratio and the engine speed. The line pressure is controlled to prevent the belt from slipping on pulleys in order to transmit the output of the engine.

At the start of the vehicle, the transmission ratio is set at a maximum value. When the vehicle speed and engine speed reach set values under a driving condition, the transmission ratio starts to change (to upshift). The transmission ratio is automatically and continuously reduced at a speed which is decided by line pressure, pressure of oil supplied to the servo device of the drive pulley, and actual transmission ratio. In such a system, the speed of changing of transmission ratio up to a desired transmission ratio is not controlled in accordance with driving conditions. Accordingly, hunting or overshoot of transmission ratio occurs, which causes the driveability of the vehicle to reduce.

Japanese Patent Laid Open No. 59-217048 discloses a system for controlling the transmission ratio changing speed e. Various values of the speed are stored in a look-up table and proper speed is derived from the table in accordance with engine speed and vehicle speed. The derived transmission ratio is used for deciding the control signal for the transmission ratio. However, if the viscosity of oil varies with change of temperature thereof or the variances of control valves caused by manufacturing tolerance and/or by changes with time, transmission ratio can not be properly controlled to a desired transmission ratio. As a result a deviation between the desired ratio and the actual ratio remains in a steady driving state.

SUMMARY OF THE INVENTION

The object of the present invention is to provide a system which may control the transmission ratio to a desired ratio without deviation by correcting the control signal.

According to the present invention, there is provided a control system for a continuously variable transmission for transmitting the power of an internal combustion engine, the system comprising a drive pulley having a hydraulically shiftable disc, a driven pulley having a hydraulically shiftable disc and a hydraulic cylinder for operating the disc, a belt engaged with both pulleys, a first hydraulic circuit having a pump for supplying oil to both the hydraulic cylinders, a transmission ratio control valve having a spool for controlling the oil supplied to the cylinders of the drive pulley to change the transmission ratio.

The system comprises first means for shifting the spool, sensing means for sensing operating conditions of the engine and the transmission and for producing a first signal dependent on the conditions, second means responsive to the first signal for producing a desired transmission ratio, control means responsive to the desired transmission ratio for producing a control signal for operating the first means to shift the spool to control the transmission ratio, third means for detecting a steady state of the transmission and for producing a steady state signal, fourth means for detecting deviation between the desired transmission ratio and an actual transmission ratio and for producing a deviation signal, fifth means responsive to the steady state signal and to the deviation signal for correcting the control signal so as to reduce the deviation.

The other objects and features of this invention will be apparently understood from the following description with reference to the accompanying drawings.

BRIEF DESCRIPTION OF DRAWINGS

FIG. 3 is a block diagram showing a control unit;

DETAILED DESCRIPTION OF THE PREFERRED EMBODIMENT

Figure 1:
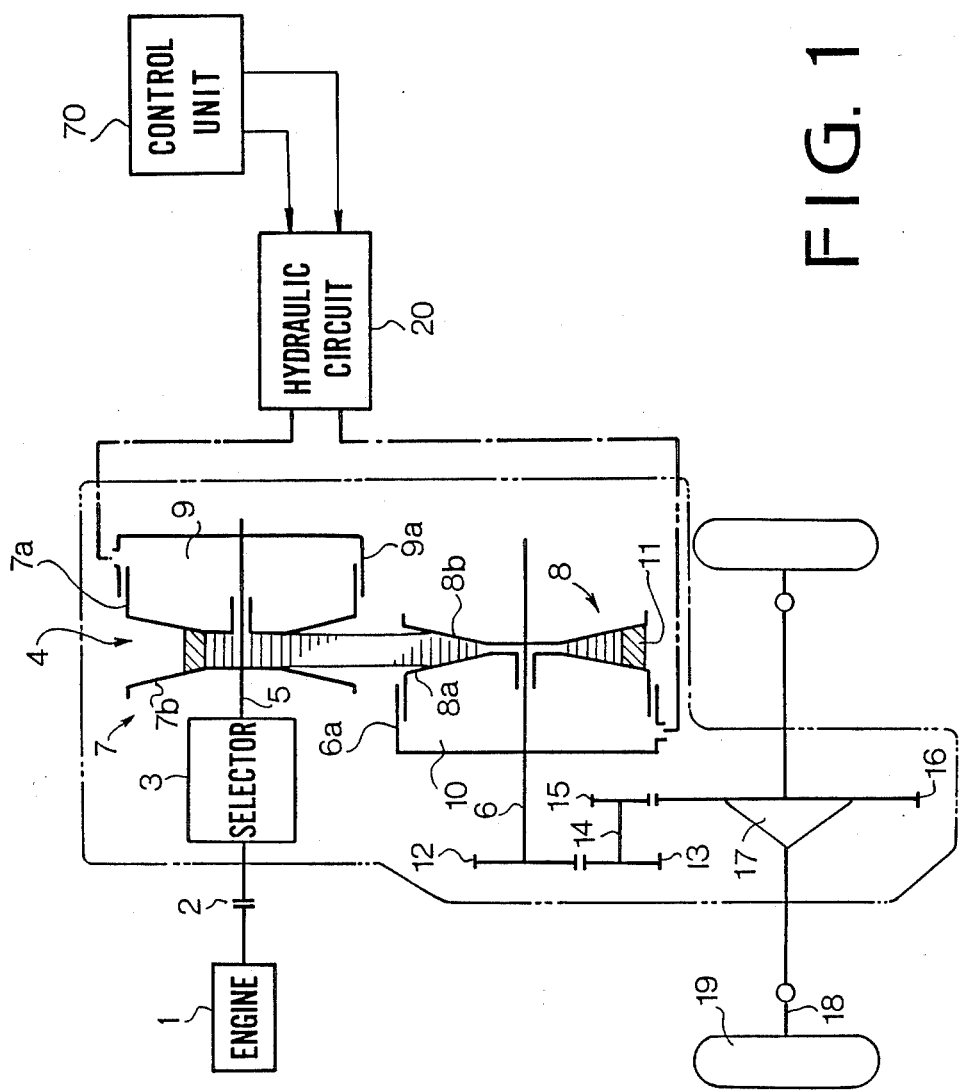
FIG. 1 is a schematic illustration of a continuously variable belt-drive transmission.

Referring to FIG. 1, a motor vehicle is provided with an engine 1, an electromagnetic powder clutch 2 for transmitting the power of the engine to a continuously variable belt-drive transmission 4 through a selector mechanism 3.

The belt-drive transmission 4 has a main shaft 5 and an output shaft 6 provided in parallel with the main shaft 5. A drive pulley (primary pulley) 7 and a driven pulley (secondary pulley) 8 are mounted on shafts 5 and 6 respectively. A fixed conical disc 7b of the drive pulley 7 is integral with main shaft 5 and an axially movable conical disc 7a is axially slidably mounted on the main shaft 5. The movable conical disc 7a also slides in a cylinder 9a formed on the main shaft 5 to provide a servo device. A chamber 9 of the servo device communicates with a hydraulic circuit 20.

A fixed conical disc 8b of the driven pulley 8 is formed on the output shaft 6 opposite a movable conical disc 8a. The conical disc 8a has a cylindrical portion which is slidably engaged in a cylinder 6a of the output shaft 6 to form a servo device. A chamber 10 of the servo device is also communicated with control circuit 20. A drive belt 11 engages with the drive pulley 7 and the driven pulley 8.

Secured to the output shaft 6 is a drive gear 12 which engages with an intermediate reduction gear 13 on an intermediate shaft 14. An intermediate gear 15 on the shaft 14 engages with a final gear 16. The rotation of the final gear 16 is transmitted to axles 18 of vehicle driving wheels 19 through a differential 17.

Figure 2A:
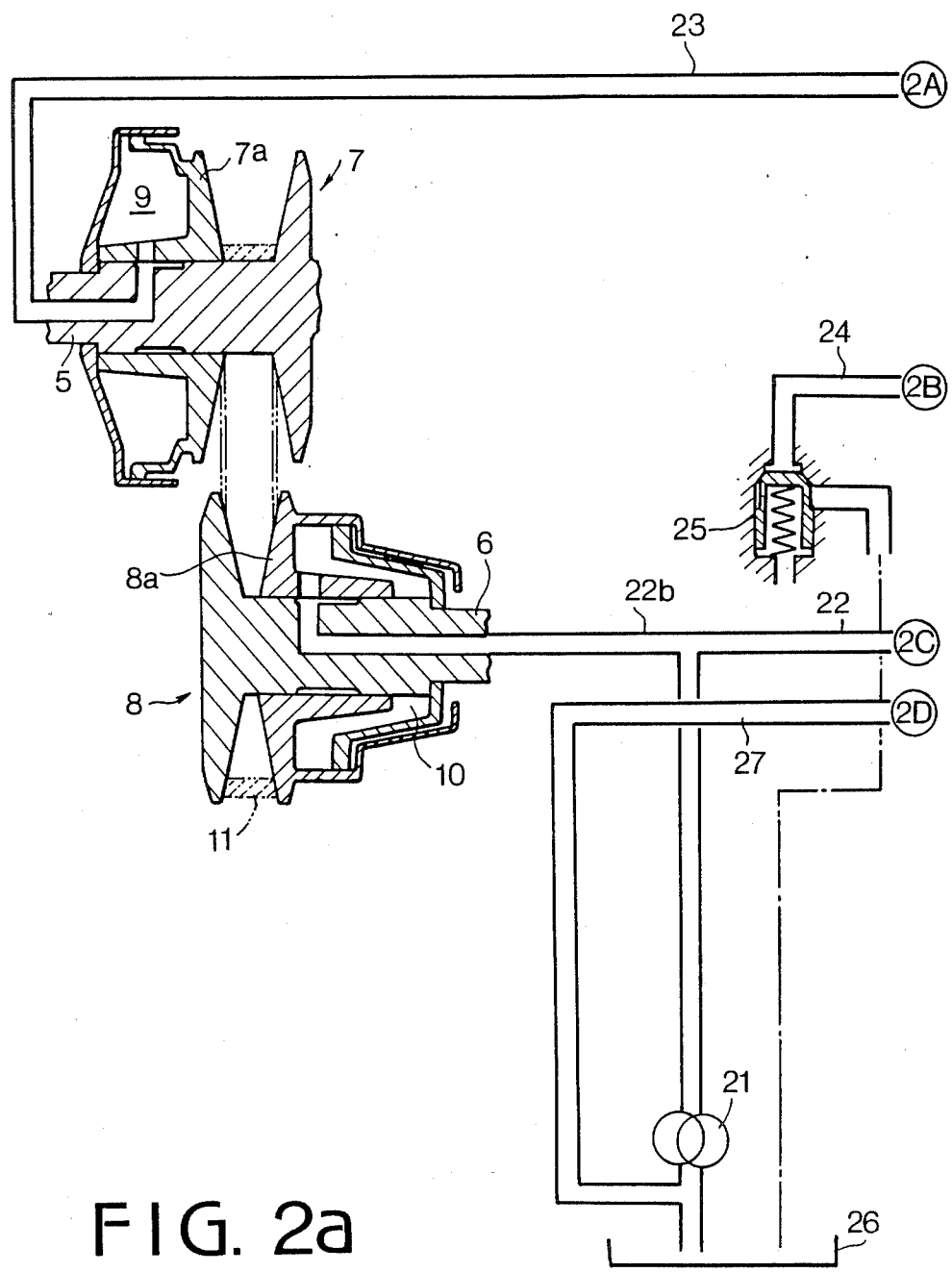
FIG. 2a and 2b are schematic diagrams showing a control system according to the present invention.
Figure 2B:
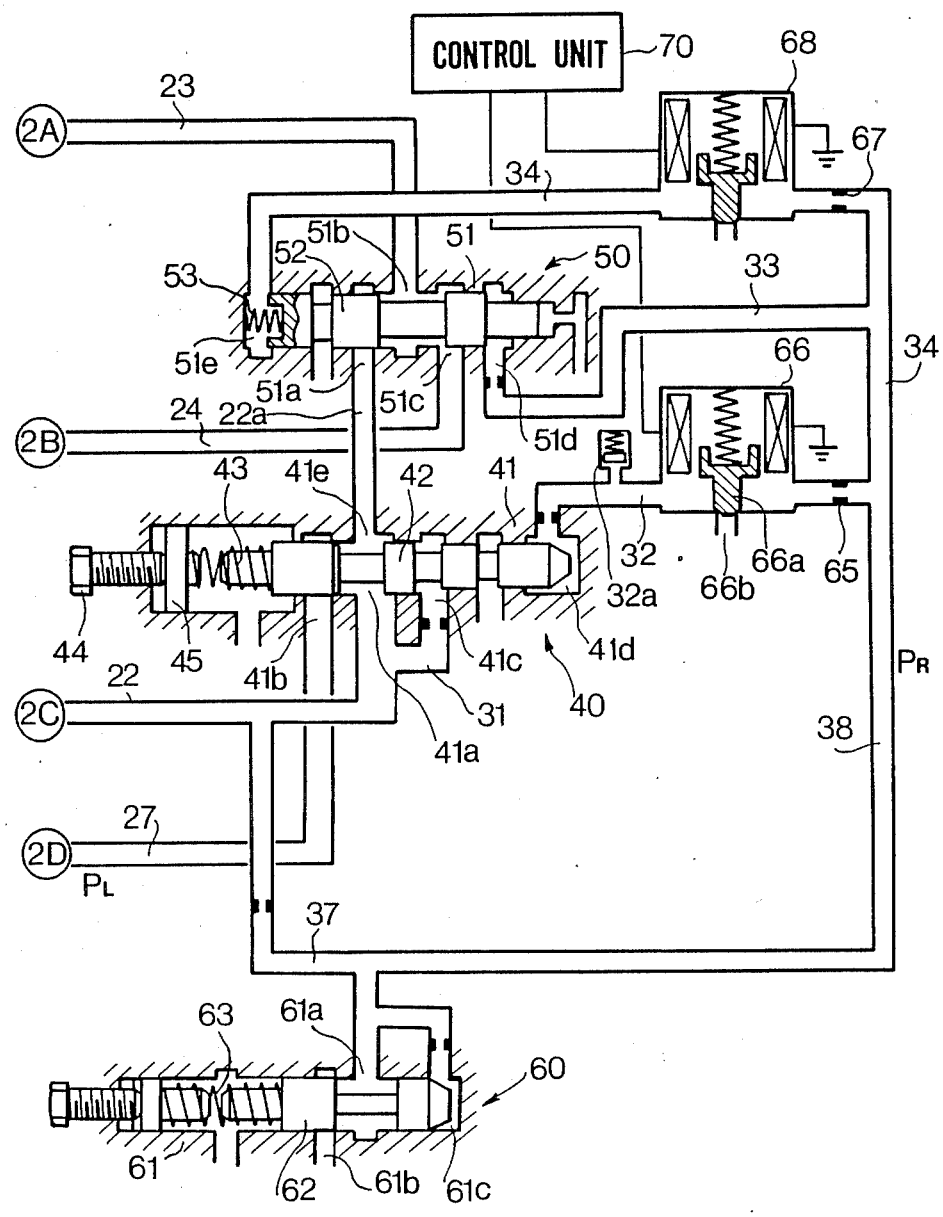

Referring to FIGS. 2a and 2b, chamber 9 of the drive pulley 7 is supplied with pressurized oil by an oil pump 21 from an oil reservoir 26 passing through a line pressure conduit 22, ports 41a and 41e of a line pressure control valve 40, transmission ratio control valve 50, and conduit 23. The chamber 10 of driven pulley 8 is applied with pressurized oil through a passage 22b without passing through valves 40 and 50. The movable conical disc 7a of the drive pulley 7 is so designed that the pressure receiving area thereof is larger than that of movable conical disc 8a of the driven pulley 8. The line pressure control valve 40 comprises a valve body 41, spool 42, and chambers 41c and 41d. The spool 42 is applied with pressure of the pressurized oil in the chamber 41c supplied through a conduit 31. The other end of the spool 42 is applied with the force of a spring 43 provided between the end of the spool 42 and a retainer 45 the position of which is adjustable by a screw 44. The port 41a is communicated with a drain port 41b for a drain passage 27 in accordance with the position of a land of the spool 42. The drain port 41b communicates with oil reservoir 26 through passage 27.

The transmission ratio control valve 50 comprises a valve body 51, spool 52, spring 53 for urging the spool 52 in the downshift direction. A port 51b of the valve body 51 is selectively communicated with a pressure oil supply port 51a or a drain port 51c in accordance with the position of lands of spool 52. Port 51b communicates with chamber 9 through conduit 23, and port 51a communicates with port 41e of line pressure control valve 40 through conduit 22a. The drain port 51c is communicated with the oil reservoir 26 through a conduit 24 and a check valve 25.

The system is provided with a regulator valve 60, and solenoid operated on-off valves 66 and 68.

The regulator valve 60 comprises a valve body 61, an inlet port 61a connected to the pump 21 through passages 37 and 22, a spool 62, an end chamber 61c connected to the passage 37, and a spring 63 urging the spool 62 to the chamber 61c. When the pressure of oil in the chamber 61c becomes higher than a set value, the spool 62 is shifted to the left, so that an inlet port 61a communicates with a drain port 61b to drain the oil. Thus, a constant pressure of oil is provided in the passage 37.

The passage 37 is communicated with the chamber 41d of line pressure control valve 40 through a constant pressure passage 38, orifice 65, solenoid operated on-off valve 66, and passage 32 having an accumulator 32a. Further, the passage 38 is communicated with an end chamber 51d of the transmission ratio control valve 50 through a passage 33, and with another end chamber 51e through an orifice 67, solenoid operated on-off valve 68 and passage 34. The solenoid operated on-off valve 66 is adapted to be operated by pulses. When energized, a valve 66a opens a drain port 66b. The pulsation of the pressure of oil in the passage 32 is smoothed by accumulator 32a. The solenoid operated on-off valve 68 is the same as valve 66 in construction and operation. The valves 66 and 68 are operated by signals from a control unit 70. Thus, pressure controlled by the valves 66 and 68 is applied to chambers 41d and 51e.

In the transmission ratio control valve 50, pressure receiving area of the spool 52 at chamber 51e is set to a value larger than the area at the chamber 51d. On the other hand, the control pressure in the chamber 51e can be changed between a maximum value, which is the same as the constant pressure in the chamber 51d, when the duty ratio is 0% and zero by controlling the duty ratio of pulses for operating the valve 68. The transmission ratio control valve 50 is so arranged that the spool 52 is at a neutral position at a middle duty ratio (for example 50%) and is located in an oil supply position by increasing the duty ratio from the middle duty ratio because of reduction of control pressure in the chamber 51e. Further, the speed of the movement of the spool 52 changes with the magnitude of changing of the duty ratio. The spool 52 is shifted to an oil drain position by decreasing the duty ratio. It will be understood that when the oil is supplied to the chamber 9 by increasing the duty ratio, the transmission is upshifted.

The relationship between the duty ratio of pulses applied to the solenoid operated control valve 68 and the transmission ratio is explained hereinafter.

Necessary volume V of oil in the chamber 9 is a function of transmission ratio i, namely:

$$V = f(i)$$

Flow rate Q is obtained by differentiating the volume V with time and expressed as $$Q = dV/dt = df(i)/di \cdot di/dt$$
$$di/dt = f(Q,i)$$

Supply flow rate $Q_s$ and drain flow rate $Q_d$ are presented as $$Q_d = C \cdot S_d \sqrt{(2g\ P_p)/\gamma}$$
$$= a \cdot S_d \sqrt{P_p}$$
$$Q_s = a \cdot S_s \sqrt{Pl - P_p}$$
$$a = c \sqrt{2g/\gamma}$$

where
$P_p$ is the pressure in chamber 9,
Pl is the line pressure,
C is the coefficient for flow rate,
g is the acceleration of gravity,
$\gamma$ is the specific gravity of oil,
$S_s$ is the opening area of supply port 51a,
$S_d$ is the opening area of drain port 51c.

Designating by D the duty ratio of pulses applied to the control valve, that is the ratio of ON/OFF of the valve, average flow rate Q in one cycle (oil supply state is positive) is $$Q = a(D \cdot S_s \sqrt{Pl - P_p} - (1 - D) \cdot S_d \sqrt{P_p})$$

Assuming a, $S_s$ and $S_d$ to be constants, $$Q = f(D, Pl, P_p)$$

The line pressure Pl is decided by the transmission ratio i and engine torque, and the pressure $P_p$ in the chamber 9 is decided by the transmission ratio i and the line pressure Pl. Accordingly, assuming the engine torque to be constant, $$Q = f(D, i)$$

Since di/dt = f(Q, i)

$$di/dt = f(d, i)$$

Therefore $$D = f(di/dt, i)$$

Accordingly, the duty ratio is decided by the transmission ratio changing speed rate di/dt and the transmission ratio i. In a feedback control system, the transmission ratio changing speed rate di/dt can be decided by the difference between the actual transmission ratio i and a desired transmission ratio id, as follows.

$$di/dt = K1 \ (id-i)$$

where K1 is a coefficient.

Further, if the transmission ratio changing speed rate di/dt is decided, the duty ratio D can be obtained from the speed. When the actual transmission ratio i is larger than the desired transmission ratio id (i>id), the value of di/dt is negative. In such a state, the duty ratio D is increased to reduce the pressure in the chamber 51e so as to upshift the transmission. The downshift is performed in the reverse manner.

However, the response of the transmission control system including various mechanisms is slow, which means that the conversion of the actual transmission ratio to the desired transmission ratio delays.

In order to eliminate the control delay, the transmission ratio changing speed rate di/dt is corrected by the speed of change of the desired transmission ratio (did/dt), as follows.

$$di/dt = K1 \ (id-i) + K2 \cdot did/dt$$

where K2 is a coefficient.

The desired transmission ratio changing speed rate did/dt is to advance the phase of the control operation. Thus, the response of the system can be improved. The speed rate did/dt is obtained by the amount ($\Delta id$) of change of the desired transmission ratio at a predetermined intervals ($\Delta t$), that is $\Delta id/\Delta t$.

The coefficient K1 may be changed in accordance with the opening degree of the throttle valve, and the coefficient K2 may also be changed in accordance with physical conditions of the system, such as viscosity of oil used in the system.

Referring to FIG. 3, the system is arranged to control the transmission ratio in accordance with the above described principle. In the system, a drive pulley speed sensor 71, driven pulley speed sensor 72, engine speed sensor 73 and throttle position sensor (or intake manifold pressure sensor) 74 are provided. Output signals $N_P$ and $N_S$ of sensors 71, 72 are fed to an actual transmission ratio calculator 75 to produce an actual transmission ratio i in accordance with $i = N_P/N_S$. The output signal $N_S$ and output signal $\theta$ representing the opening degree of the throttle position sensor 74 are fed to a desired transmission ratio table 76. The desired transmission ratio id is derived from the table 76 in accordance with the speed $N_S$ and signal $\theta$.

The desired transmission ratio id is fed to a desired transmission ratio changing speed calculator 78 which produces a desired transmission ratio changing speed rate did/dt. A coefficient setting section 79 produces coefficients K1 and K2. The actual transmission ratio i, desired transmission ratio id, desired transmission ratio changing speed rate did/dt and coefficients K1 and K2 are applied a transmission ratio changing speed calculator 80 to produce a transmission ratio changing speed rate di/dt from the formula di/dt=K1(id−i)+K2·did/dt. However, the formula does not represent the transmission ratio changing direction, that is the upshift direction or downshift direction. In order to decide the direction, the formula is rewritten as follows.

$$di/dt = K1 \cdot \{(id + K_2/K_1 \cdot did/dt) - i\}$$

When $(id + K_2/K_1 \cdot did/dt) > i$ and di/dt>0, the transmission is downshifted, and when $(id + K_2/K_1 \cdot did/dt) < i$ and di/dt<0, upshifted.

The speed di/dt and actual ratio i are applied to a duty ratio table 81 to derive the duty ratio D. The duty ratio D is supplied to the solenoid operated on-off valve 68 through a duty ratio correcting section 112 and a driver 82.

Further, the output signal 0 of throttle position sensor 74 and the output $N_e$ of engine speed sensor 73 are fed to an engine torque calculator 96, so that engine torque T is calculated based on throttle position 8 and engine speed $N_e$.

On the other hand, the actual transmission ratio i from the calculator 75 is applied to a necessary line pressure table 103 to derive a necessary line pressure $P_{LU}$ per unit torque. The necessary line pressure $P_{LU}$ and the engine torque T are applied to a desired line pressure calculator 104 where a desired line pressure $P_L$ is calculated.

The desired line pressure $P_L$ is applied to a duty ratio table 105 to derive a duty ratio $D_L$ corresponding to the desired line pressure $P_L$. The duty ratio $D_L$ is supplied to a driver 106 which operates the solenoid operated on-off valve 66 at the duty ratio.

When the control system is properly operated, the actual transmission ratio converges on the desired transmission ratio in a steady driving condition. The fact that there is a deviation between actual and desired transmission ratios means failures of the system. Accordingly, in the system of the invention, the detecting means for detecting the deviation in a steady state is provided, as described hereinafter.

The throttle valve opening degree signal 0 is applied to a steady state detector 110 in which opening degree changing speed dO/dt is calculated. When the speed d$\theta$/dt is below a small value, the vehicle driving condition is regarded as steady. The detector 110 produces a steady state signal in such a steady state and the signal is fed to a correcting quantity calculator 111. As the method for the detection of the steady state, at least one of changing rates of vehicle speed, desired transmission ratio id, and actual transmission ratio i may be used.

The correcting quantity calculator 111 is applied with signals i, id and $N_P$. Deviation $\Delta i$ is obtained by absolute value $|id - i|$ in the calculator 111. Correcting quantity $\Delta D$, which is applied to the correcting section 112 to correct the duty ratio D, is decided as an increasing function of the deviation $\Delta i$ ($\Delta D = f(\Delta i)$). For example, the function for correcting quantity $\Delta D$ is composed by proportional (P) and integral (I) correcting terms, as follows.

$$\Delta D = f(\Delta i) = f(\Delta D_I, \Delta D_P)$$

Figure 4A:
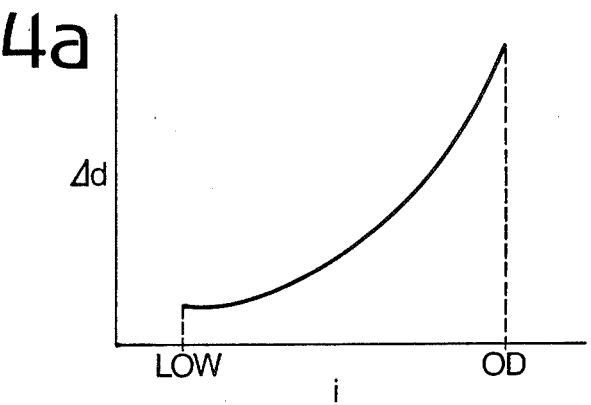
FIGS. 4a to 4c are graphs showing characteristics of a transmission.
Figure 4B:
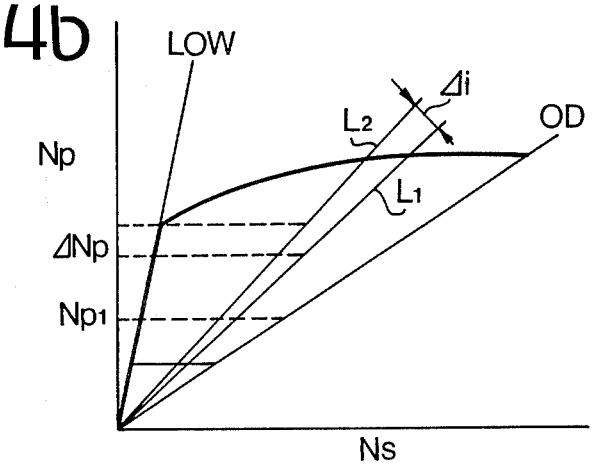
Figure 4C:
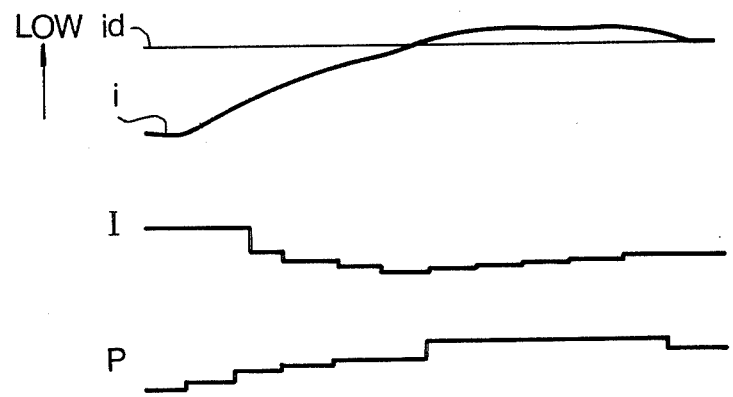

FIG. 4c shows the deviation and proportional and integral constituents under a downshift condition (id>i).

On the other hand, necessary flow rate of oil for providing a speed di/dt becomes large as the transmission ratio i becomes small (high vehicle speed). Accordingly, correcting quantity Δd at a time becomes large with reduce of the transmission ratio i as shown in FIG. 4a. As described hereinafter, the duty ratio D is reduced, the transmission is downshifted. Accordingly, in order to correct the duty ratio in the downshift direction, correcting quantity is set to −Δd.

Further, considering relationship between the change of transmission ratio and the speed of the drive pulley (engine speed), the speed of the drive pulley must be largely changed in a high speed range when the difference (Δi) between transmission ratios is constant. FIG. 4b shows various transmission ratio lines. When the transmission ratio is downshifted from a line $L_1$ to line $L_2$ by Δi, the increment $\Delta N_P$ of drive pulley speed increases with increase of the speed. Accordingly, when the drive pulley speed $N_P$ is higher than a predetermined value $N_{Pl}$, the correcting quantity is corrected by a calculation Δd·α or −Δd·α (where, α>1).

In operation, while the vehicle is at a stop, chamber 10 of the driven pulley 8 is supplied with line pressure through passage 22b, and the chamber 9 of the drive pulley 7 is drained, since the $N_P$, $N_s$, θ are zero and duty ratio D is zero, and the spool 52 is at the right end position and the drain port 51c communicates with the chamber 9 through the conduit 23 as shown in FIGS. 2a and 2b. Thus, in the pulley and belt device of the continuously variable belt-drive transmission, the driving belt 11 engages with the driven pulley 8 at a maximum running diameter to provide the largest transmission ratio (low speed stage). When the accelerator pedal is depressed, the clutch current increases progressively with increase of engine speed. The electromagnetic clutch 2 is gradually engaged, transmitting the engine power to the drive pulley 7. The power of the engine is transmitted to the output shaft 6 at the largest transmission ratio by the driving belt 11 and driven pulley 8, and further transmitted to axles of the driving wheels 19. Thus, the vehicle is started. When the vehicle speed (output signal $N_s$) exceeds a predetermined value, the clutch 2 is entirely engaged.

At the start of the vehicle, the line pressure is at the highest value by the pressure control valve 40, since the duty ratio for the valve 66 is large, and the spool 42 of the control valve 40 is at the right end position. When the throttle valve is opened for acceleration of the vehicle, the desired transmission ratio id, desired transmission ratio changing speed did/dt and transmission ratio changing speed di/dt are calculated at calculators 77, 78, 80. The transmission ratio changing speed di/dt is fed to the duty ratio table 81, so that duty ratio D for valve 68 is obtained from the table 81. When the depression of the accelerator pedal stops, the transmission ratio changing speed di/dt becomes negative. Accordingly, the value of the duty ratio D becomes larger than the neutral value, so that the pressure in the chamber 51d of the control valve 50 is higher than the chamber 51e. Thus, the spool 52 is shifted to the left to communicate the port 51a with port 51b, so that oil is supplied to the chamber 9 through the conduit 23 to upshift the transmission. When the actual transmission ratio i reaches the desired transmission ratio id, the changing speed di/dt becomes zero, so that the upshifting operation stops.

On the other hand, duty ratio for the valve 66 is reduced, thereby shifting the spool 42 of the valve 40 to the left. The port 41a communicates with the port 41b of the drain passage 27. Thus, line pressure reduces, and the transmission is upshifted to the desired transmission ratio id at the speed di/dt.

As the difference between the desired ratio id and actual ratio i becomes large and the desired transmission ratio changing speed becomes large, the duty ratio for the valve 68 becomes large, thereby increasing the shifting speed of the spool 52 to increase the actual transmission changing speed. When the opening degree of the throttle valve is reduced for deceleration at a small transmission ratio (overdrive), the duty ratio is reduced along a low engine speed line, thereby shifting the spool 52 to the right to drain the chamber 9. Thus, the transmission is downshifted. The transmission changing speed at downshifting increases with reducing of the duty ratio.

The control operation of line pressure will be described hereinafter. From the engine torque calculator 96, a torque T is obtained in accordance with throttle position θ and engine speed $N_e$, which is applied to desired line pressure calculator 104. The calculator calculates a desired line pressure $P_L$. The solenoid operated on-off valve 66 is operated at a duty ratio corresponding to the desired line pressure $P_L$. The line pressure is applied to chamber 10 to hold the belt 11 at a necessary minimum force, the transmitting torque at which is slightly larger than torque T. Thus, power is transmitted through the transmission without slipping of the belt.

Figure 5:
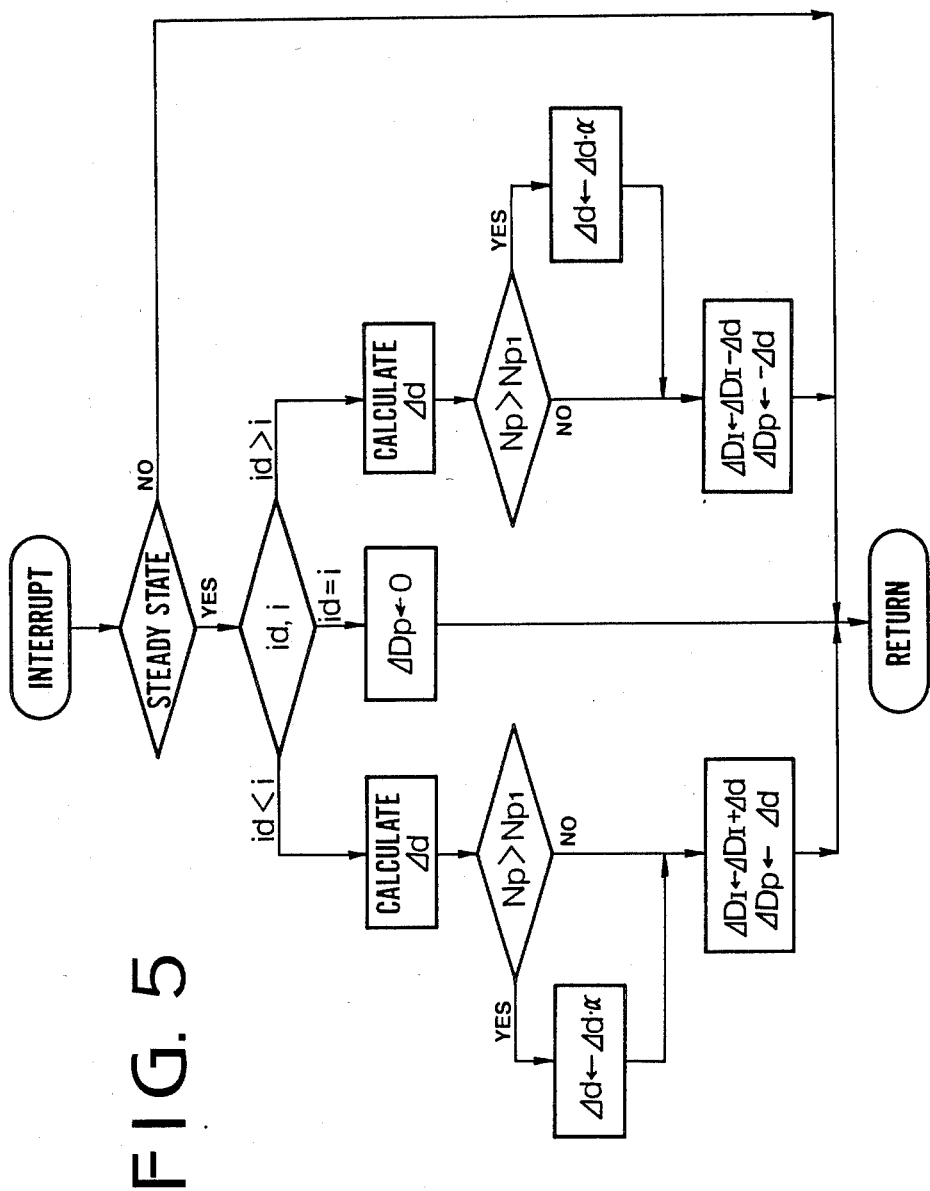
FIG. 5 is a flowchart showing the operation of the system.
Figure 6:
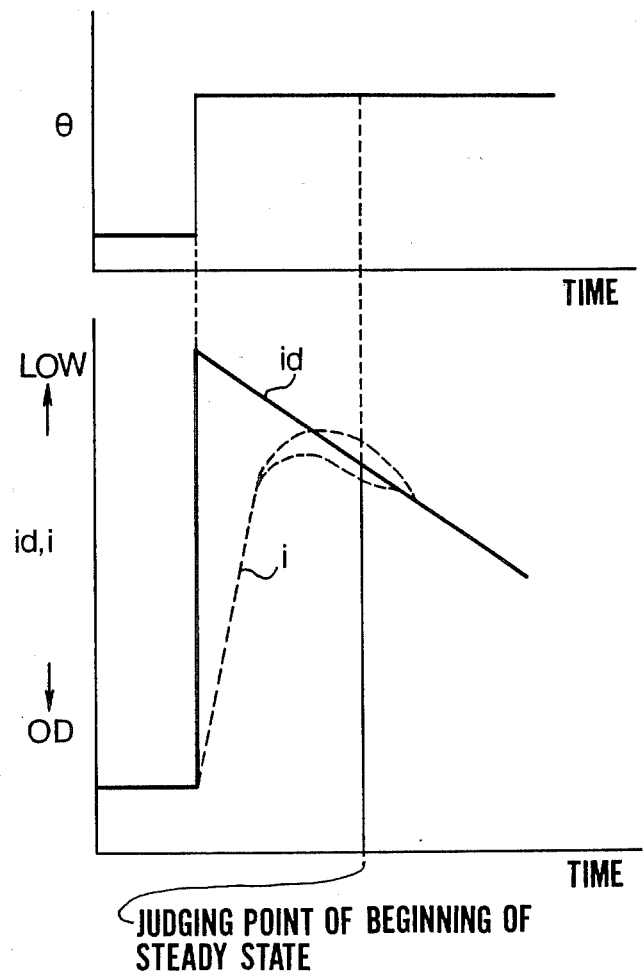
FIG. 6 is a graph showing convergence of actual transmission ratio.

Correcting operation is described hereinafter with reference to FIG. 5. At a steady state, the correcting quantity ΔD is calculated in accordance with the deviation Δi = |id − i|. When id<i, correcting quantity ΔD is calculated by $\Delta D_I = f(\Delta D_I - \Delta d)$ and $\Delta D_P = -\Delta d \cdot \alpha$. The duty ratio correcting section 112 corrects the duty ratio D by calculation D+ΔD to reduce the duty ratio to downshift the transmission. When id<i, the duty ratio is increased to upshift. FIG. 6 shows the converging operation of the actual transmission ratio i.

Figure 7:
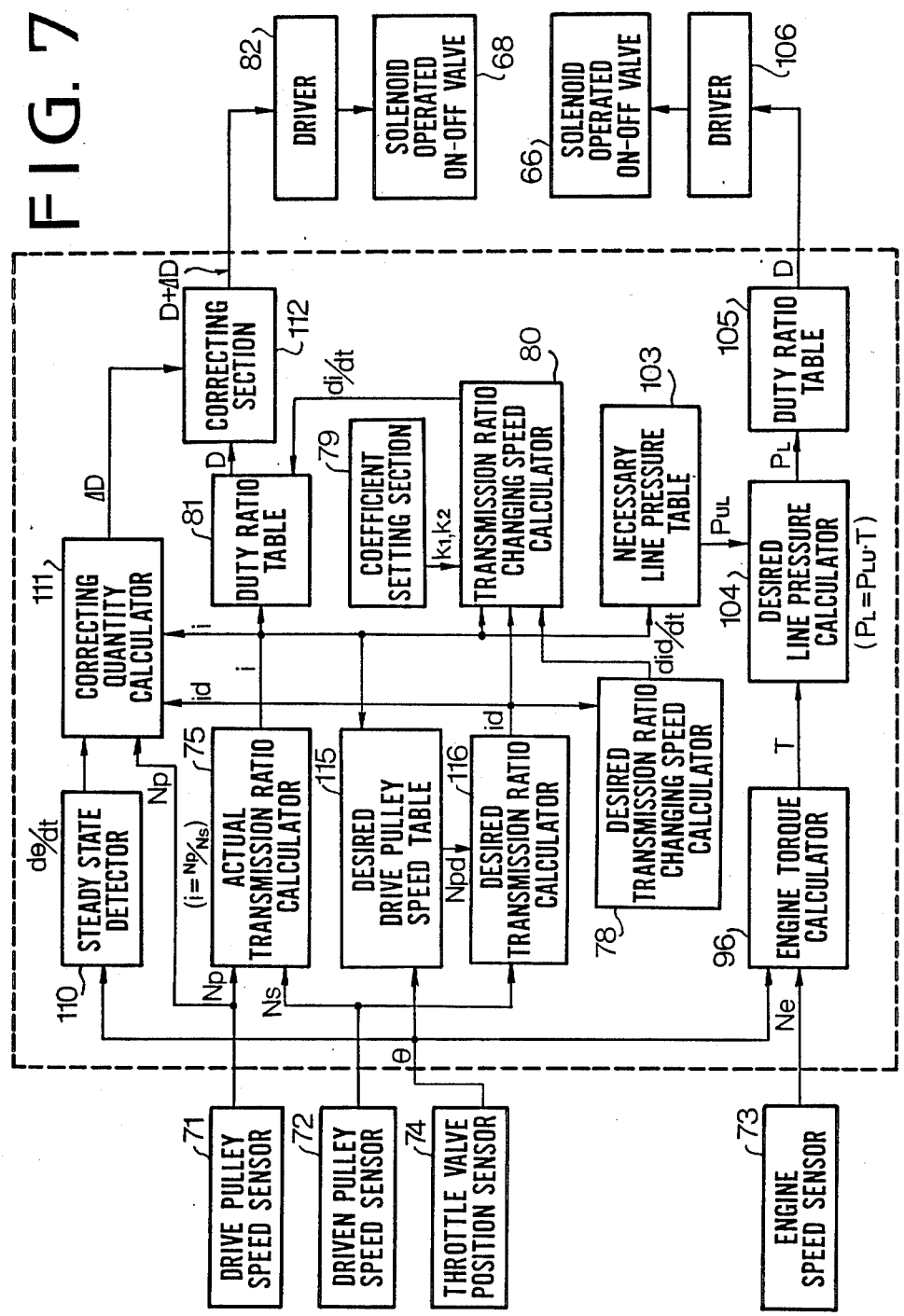
FIG. 7 is a block diagram showing a modification of the control unit.
Figure 8:
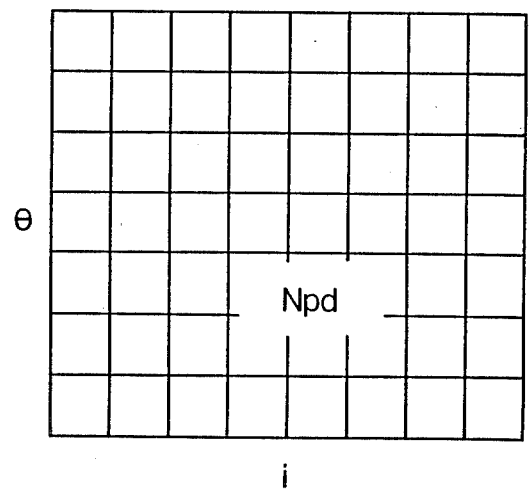
FIG. 8 shows a look-up table for desired drive pulley speed.

Referring to FIG. 7 showing another embodiment of the invention, actual transmission ratio i and output signal θ representing the opening degree of the throttle position sensor 74 are fed to a desired drive pulley speed table 115. The desired drive pulley speed $N_Pd$ is derived from the table 115 in accordance with the ratio i and signal θ. FIG. 8 shows a look-up table for the desired drive pulley speed $N_Pd$.

The desired drive pulley speed $N_Pd$ and driven pulley speed $N_S$ are fed to a desired transmission ratio calculator 116 where the calculation of desired transmission ratio (id), id=$N_Pd/N_S$ is made. The desired transmission ratio id is fed to desired transmission ratio changing speed calculator 78 which produces a desired transmission ratio changing speed did/dt.

Other parts of the system are the same as the first embodiment and identified with the same references. The operation of the second embodiment is substantially same as the first embodiment.

While the presently referred embodiment of the present invention has been shown and described, it is to be understood that this disclosure is for the purpose of illustration and that various changes and modifications may be made without departing from the spirit and scope of the invention as set forth in the appended claims.

What is claimed is:

1. In a control system for a continuously variable transmission for transmitting the power of an internal combustion engine for driving a motor vehicle, the transmission having a drive pulley having a hydraulically shiftable disc and a hydraulic cylinder for operating the disc, a driven pulley including a hydraulically shiftable disc and a hydraulic cylinder for operating the latter disc, and a belt engaged with both pulleys, the control system including a first hydraulic circuit having a pump for supplying oil to both the hydraulic cylinders, and a transmission ratio control valve having a shiftable spool for controlling the oil supplied to at least one of the cylinders, wherein the improvement in the control system comprises:

shifting means for shifting the spool of the transmission ratio control valve;

sensing means for sensing operating conditions of the engine and transmission and for producing a first signal dependent on the conditions;

first means responsive to the first signal for producing a desired transmission ratio value;

control means responsive to the desired transmission ratio value for producing a control signal for operating the shifting means to shift the spool to control the transmission ratio of the transmission to the desired transmission ratio value;

detector means for detecting a steady state driving condition and for producing a steady state signal;

second means responsive to the steady state signal for detecting deviation between the desired transmission ratio value and an actual transmission ratio value of the transmission and for producing a deviation signal;

third means responsive to the deviation signal for correcting the control signal so as to reduce the deviation.

2. The control system according to claim 1 wherein the transmission ratio control valve has chambers at both ends of the spool, the shifting means includes a second hydraulic circuit for supplying control oil to the chambers, and control valve means provided in the second hydraulic circuit for controlling flow rate of the control oil supplied to the chambers of the transmission ratio control valve.

3. The control system according to claim 2 wherein the control valve means is a solenoid operated on-off valve, and the control signal of the control unit is pulses, the duty ratio of which is changed so as to control the transmission ratio changing speed rate.

4. The control system according to claim 2 wherein the second hydraulic circuit is provided with a regulator valve for maintaining the pressure of the control oil at a constant value.

5. The control system according to claim 1, wherein said second means is further responsive to speed of the drive pulley being greater than a predetermined value for correcting said deviation signal.

6. The control system according to claim 1, wherein said detector means detects steady state by detecting rate of change of a parameter with respect to time as being substantially zero.

7. The control system according to claim 6, wherein said parameter is engine load.

8. The control system according to claim 6, wherein said parameter is throttle valve opening degree.

9. The control system according to claim 6, wherein said parameter is vehicle speed.

10. The control system according to claim 6, wherein said parameter is the actual transmission ratio value.

11. The control system according to claim 6, wherein said parameter is the desired transmission ratio value.

12. The control system according to claim 6, wherein said first means comprises a desired drive pulley speed table responsive to load on the engine and the actual transmission ratio value to provide a desired drive pulley speed, and a desired transmission ratio calculator dividing said desired drive pulley speed by speed of the driven pulley.

13. The control system according to claim 6, wherein said first means comprises a desired transmission ratio table responsive to engine load and speed of the driven pulley.

* * * * *